United States Patent
Yao et al.

(10) Patent No.: US 11,234,012 B2
(45) Date of Patent: Jan. 25, 2022

(54) METHOD AND APPARATUS FOR PERFORMING GROUP MARKING ON UNIFORM TRANSFORM UNIT MODE AND ELECTRONIC DEVICE

(71) Applicant: FUJITSU LIMITED, Kawasaki (JP)

(72) Inventors: Jie Yao, Beijing (CN); Wenting Cai, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/900,263

(22) Filed: Jun. 12, 2020

(65) Prior Publication Data
US 2020/0314441 A1    Oct. 1, 2020

Related U.S. Application Data

(63) Continuation of application No. PCT/CN2018/101449, filed on Aug. 21, 2018.

(30) Foreign Application Priority Data

Jan. 12, 2018   (CN) .......................... 201810030165.1

(51) Int. Cl.
| | | |
|---|---|---|
| *H04N 19/46* | (2014.01) | |
| *H04N 19/18* | (2014.01) | |
| *H04N 19/96* | (2014.01) | |

(52) U.S. Cl.
CPC ............. *H04N 19/46* (2014.11); *H04N 19/18* (2014.11); *H04N 19/96* (2014.11)

(58) Field of Classification Search
None
See application file for complete search history.

(56) References Cited

U.S. PATENT DOCUMENTS

| | | |
|---|---|---|
| 2013/0188731 A1 | 7/2013 | Kim et al. |
| 2013/0266074 A1 | 10/2013 | Guo et al. |
| | (Continued) | |

FOREIGN PATENT DOCUMENTS

| | | |
|---|---|---|
| CN | 103262541 | 8/2013 |
| CN | 104065460 A | 9/2014 |
| | (Continued) | |

OTHER PUBLICATIONS

International Search Report dated Nov. 27, 2018 in corresponding International Application No. PCT/CN2018/101449.

(Continued)

*Primary Examiner* — Edemio Navas, Jr.
(74) *Attorney, Agent, or Firm* — Staas & Halsey LLP

(57) ABSTRACT

A method and apparatus for performing group marking on a uniform transform unit mode and an electronic device are provided. The method includes: marking group units according to uniform transform unit modes of coding units included in the group units; wherein when the uniform transform unit modes of the coding units in the group units have a first value, a flag is set to be of a second value, and the group units are marked by using the first flag; and marking the coding units in the group units according to the uniform transform unit modes of the coding units included in the group units. According to this disclosure, when the uniform transform unit modes of the coding units in the group units are identical, the uniform transform unit modes of the coding units in the group units are not marked, thereby saving storage capability, transmission capability and processing capability.

9 Claims, 4 Drawing Sheets

(56) References Cited

U.S. PATENT DOCUMENTS

| | | | |
|---|---|---|---|
| 2015/0030067 A1* | 1/2015 | Zhao | H04N 19/132 375/240.02 |
| 2015/0063437 A1 | 3/2015 | Murakami et al. | |
| 2016/0006455 A1 | 1/2016 | Miyashita et al. | |
| 2017/0127058 A1 | 5/2017 | Misra et al. | |
| 2017/0214931 A1 | 7/2017 | Sasai et al. | |

FOREIGN PATENT DOCUMENTS

| | | |
|---|---|---|
| CN | 104205842 A | 12/2014 |
| CN | 104247424 A | 12/2014 |
| CN | 105282554 A | 1/2016 |
| WO | 2016/206590 A1 | 12/2016 |

OTHER PUBLICATIONS

Yan Ke, etc. "A rapid classification decision algorithm on CU depth based on temporal-spatial correlation" Journal of Optoelectronics • Laser, vol. 25 No. 1, Jan. 2014.

* cited by examiner

METHOD AND APPARATUS FOR PERFORMING GROUP MARKING ON UNIFORM TRANSFORM UNIT MODE AND ELECTRONIC DEVICE

CROSS-REFERENCE TO RELATED APPLICATIONS

This application is a continuation application of PCT International Patent Application No. PCT/CN2018/101449, filed Aug. 21, 2018 which is based on and claims priority to Chinese Application No. 201810030165.1, filed Jan. 12, 2018, both filed in the State Intellectual Property Office of China, the contents of which are incorporated herein by reference.

TECHNICAL FIELD

This disclosure relates to the field of information technologies, and in particular to a method and apparatus for performing group marking (grouping) on a uniform transforms unit mode and an electronic device.

BACKGROUND

In the field of video coding, a uniform data structure may be used to denote an image structure of a video image, such a uniform data structure being referred to as a uniform transform unit structure. In the uniform transform coding structure, a coding unit (CU) of a video image may be divided into a number of uniform transform units, a shape of each uniform transform unit may be rectangular, and all uniform transform units in a coding unit have identical shapes and areas.

For a coding unit of a size of $2^m \times 2^n (m >= n)$, it may be divided into a number of uniform transform units in the following possible division manners that: 1. take the coding unit as a uniform transform unit, that is, the coding unit contains only one uniform transform unit; 2. a size of each uniform transform unit in the coding unit is $2^n \times 2^n$, hence, the coding unit contains $2^{m-n}$ uniform transform units; 3. a size of each uniform transform unit in the coding unit is $2^{n-1} \times 2^{n-1}$, hence, the coding unit contains $4 \times 2^{m-n}$ uniform transform units; 4. a size of each uniform transform unit in the coding unit is $2^{n-2} \times 2^{n-2}$, hence, the coding unit contains $16 \times 2^{m-n}$ uniform transform units; . . . , and so on. And in the last possible division manner, a size of each uniform transform unit in the coding unit is 2×2.

The above division manners may correspond to a uniform transform unit (UTU) mode, respectively; wherein the UTU mode may be denoted as a numerical value. For example, the above manner 1 corresponds to UTU mode=0, the above method 2 corresponds to UTU mode=1, the above method 3 corresponds to UTU mode=2, and the above method 4 corresponds to UTU mode=3.

In coding a video image, a uniform transform unit mode is set for each coding unit (CU), and the uniform transform unit mode may indicate how many uniform transform units the coding unit is divided into.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided an apparatus for performing group marking on a uniform transform unit mode of a coding unit group, the coding unit group including at least one group unit, one of the group unit including at least one coding unit, each coding unit having a corresponding uniform transform unit mode.

The apparatus includes a memory and a processor couple to the memory and configured to perform a first marking to mark group units according to uniform transform unit modes of coding units included in the group units; when the uniform transform unit modes of the coding units in one group unit have the same first value, a flag is set to be of a second value, and the group unit is marked by using the first flag; and determine whether a second marking is to be performed to mark the coding units in the group unit according to the uniform transform unit modes of the coding units included in the group unit.

According to an embodiment of this disclosure, there is provided a method for performing group marking on a uniform transform unit mode of a coding unit group, the coding unit group including at least one group unit, one of the group unit including at least one coding unit, each coding unit having a corresponding uniform transform unit mode, the method including:

marking group units according to uniform transform unit modes of coding units included in the group units; when the uniform transform unit modes of the coding units in one group unit have the same first value, a first flag is set to be of a second value, and the group unit is marked by using the first flag; and determining whether to mark marking the coding units in the group unit according to the uniform transform unit modes of the coding units included in the group unit.

According to an embodiment of this disclosure, there is provided an apparatus for performing identification on a uniform transform unit mode of a coding unit group, the coding unit group including at least one group unit, one of the group unit including at least one coding unit, each coding unit having a corresponding uniform transform unit mode.

The apparatus including a first identifying configured to, when a first flag of the group unit is of a second value, identify all uniform transform unit modes of coding units in the group unit as being of a first value.

According to an embodiment of this disclosure, there is provided a method for performing identification on a uniform transform unit mode of a coding unit group, the coding unit group including at least one group unit, one of the group unit including at least one coding unit, each coding unit having a corresponding uniform transform unit mode, the method including:

when a first flag of the group unit is of a second value, identifying all uniform transform unit modes of coding units in the group unit as being of a first value.

According to an embodiment of this disclosure, there is provided an electronic device, including the apparatus(s) as described in the first and/or the third aspect(s).

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "include/comprise" when used in this specification is taken to specify the presence of stated features, integers, steps, operations, or components but does not preclude the presence or addition of one or more other features, integers, steps, operations, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings, and these embodiments are illustrative only, and are not intended to limit this disclosure.

It was found by the inventors that in using a uniform transform unit mode for video image coding, a uniform transform unit mode set for each coding unit (CU) needs to be marked in the coding unit; however, uniform transform unit modes of most coding units (CUs) are of identical values, such as 0, repeatedly storing, transmitting and processing these identical values will result in waste of storage capability, transmission capability and processing capability.

Embodiments of this disclosure provide a method and apparatus for performing group marking on a uniform transform unit mode and an electronic device, in which when uniform transform unit modes of coding units in one group unit are identical, the uniform transform unit modes of the coding units in the group unit are not marked, thereby saving storage capability, transmission capability and processing capability.

An advantage of the embodiments of this disclosure exists in that when the uniform transform unit modes of the coding units in the group units are identical, the uniform transform unit modes of the coding units in the group units are not marked, thereby saving storage capability, transmission capability and processing capability.

Embodiment 1

Embodiment 1 of this disclosure provides a method for performing group marking on a uniform transform unit (UTU) mode of a coding unit group, applicable to a coder end coding images, the coding unit group including at least one group unit (GU), one of the group unit including at least one coding unit, each coding unit having a corresponding uniform transform unit mode, the uniform transform unit mode being indicative of how many uniform transform units the coding unit is divided into.

Figure 1:
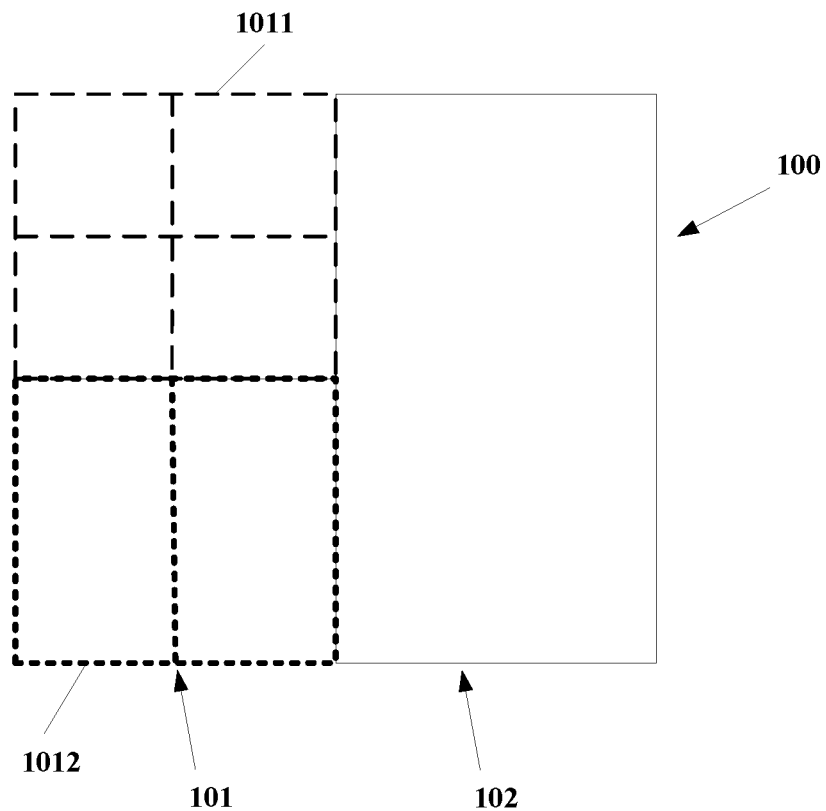
FIG. 1 is a schematic diagram of a coding unit group in an embodiment.

FIG. 1 is a schematic diagram of the coding unit group in this embodiment. As shown in FIG. 1, a coding unit group 100 includes two group units 101, 102; the group unit 101 includes two coding units 1011, 1012, the coding unit 1011 being divided into four uniform transform units, and the coding unit 1012 being divided into two uniform transform units.

In this embodiment, a value of a uniform transform unit mode to which the coding unit 1011 in FIG. 1 corresponds may be 3, and a value of a uniform transform unit mode to which the coding unit 1012 corresponds may be 2.

Figure 2:
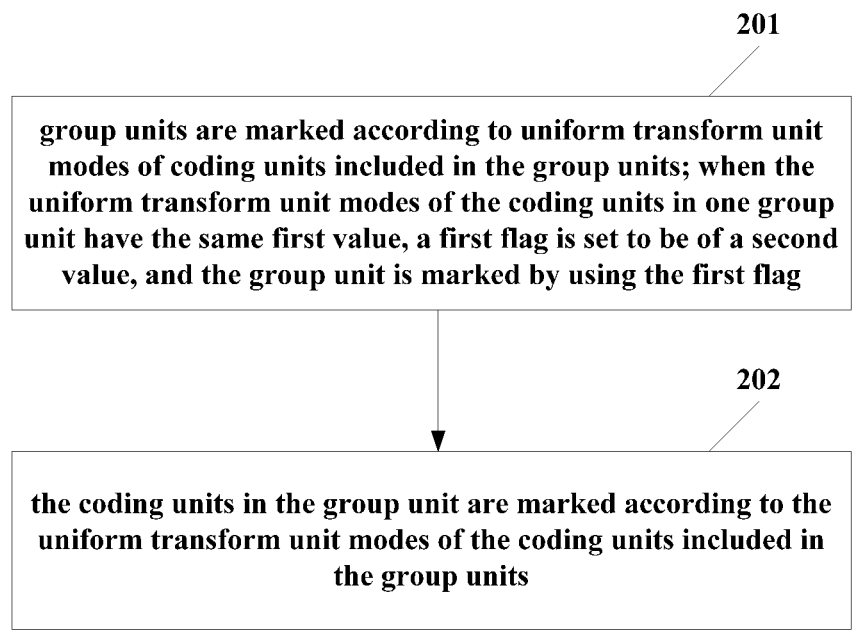
FIG. 2 is a schematic diagram of the method for performing group marking on a uniform transform unit mode in this disclosure.

FIG. 2 is a schematic diagram of the method for performing group marking on a uniform transform unit mode in this disclosure. As shown in FIG. 2, the method includes:

operation 201: group units are marked according to uniform transform unit modes of coding units included in the group units; when the uniform transform unit modes of the coding units in one group unit have the same first value, a first flag is set to be of a second value, and the group unit is marked by using the first flag; and operation 202: the coding units in the group unit are marked according to the uniform transform unit modes of the coding units included in the group units.

According to this embodiment, when the uniform transform unit modes of the coding units in the group unit are identical, the group unit is marked by using the first flag, hence, it may be indicated only by the first flag that the coding units in the group unit have identical uniform transform unit modes, thereby improving efficiency of image coding.

In operation 201 of this embodiment, the first flag of the group units may be denoted as a UTU flag. When the uniform transform unit modes of the coding units in the group unit have identical first value, the first flag of the group units may be set to be of a second value.

In this embodiment, numerical values of the uniform transform unit modes may be as described in the Background Art of this disclosure, and meanings represented by different numerical values of the uniform transform unit modes shall not be repeated herein any further.

In this embodiment, the first value may be, for example, 0, that is, the coding units in the group unit includes only one uniform transform unit. At this moment, the first flag UTU flag of the group unit may be set to be of the second value, which may be, for example, 0.

Furthermore, in this embodiment, when a value of a uniform transform unit mode of at least one coding unit in the group units is not equal to the first value, a first flag UTU flag of the group units is set to be a third value different from the second value. For example, when the uniform transform unit modes to which the coding units in the group units correspond include 0, 1 and 3, the first flag UTU flag of the group units may be set to be of the third value. The third value may be different from the first value, for example, the third value may be 1.

In this embodiment, a data structure of the coding unit group may be expressed as a quad tree plus binary tree (QT/BT) structure. Following Table 1 shows an example of quad tree plus binary tree (QT/BT) structure parameters.

TABLE 1

| | QT/BT high level parameters Intra frame (I slices) CTU Size 128 × 128 | |
|---|---|---|
| | Luma | Chroma |
| The minimum size of QT in coding unit group (MinQTSize) | 8 × 8 | 4 × 4 |
| The maximum size of BT in coding unit group (MaxBTSize) | 32 × 32 | — |
| The maximum depth of BT in coding unit group (MaxBTDepth) | 4 | 0 |
| The minimum size of BT in coding unit group (MinBTSize) | 4 | — |

In this embodiment, the group unit may satisfy certain conditions. For example, the parameter of the quad-tree and binary tree structure to which the group unit corresponds may satisfy the condition shown in following formula (1):

$$qtDepth + btDepth/2 > 2.5 \qquad (1);$$

where, qtDepth is a depth of a quad-tree structure of a node to which the group unit corresponds, and btDepth is a depth of a binary tree structure of a node to which the group unit corresponds.

By satisfying the condition shown in above formula (1), each group unit may be made to include an appropriate number of coding units. Therefore, the first flag (UTU flag) of the group unit (GU) is able to represent a uniform transform unit mode of an appropriate number of coding units.

In this embodiment, the conditions satisfied by the group unit may not be limited to those shown in above formula (1), they may also be other conditions, and this embodiment is not limited thereto.

In this embodiment, the group unit may not include other group units, that is, in the quad-tree plus binary tree structure, a node at a lowest layer in nodes satisfying the conditions shown in above formula (1) is taken as the node to which the group unit corresponds, thereby making the group unit division more concise.

In operation 202 of this embodiment, the coding units in the group units are marked according to the uniform transform unit modes of the coding units included in the group unit. For example, when a value of a uniform transform unit mode of at least one coding unit in the group units is not equal to the first value, the coding units in the group unit is marked by using uniform transform unit mode; or, when the uniform transform unit modes of the coding units in the group units all have identical first value, the coding units in the group units are not marked.

Figure 3A:
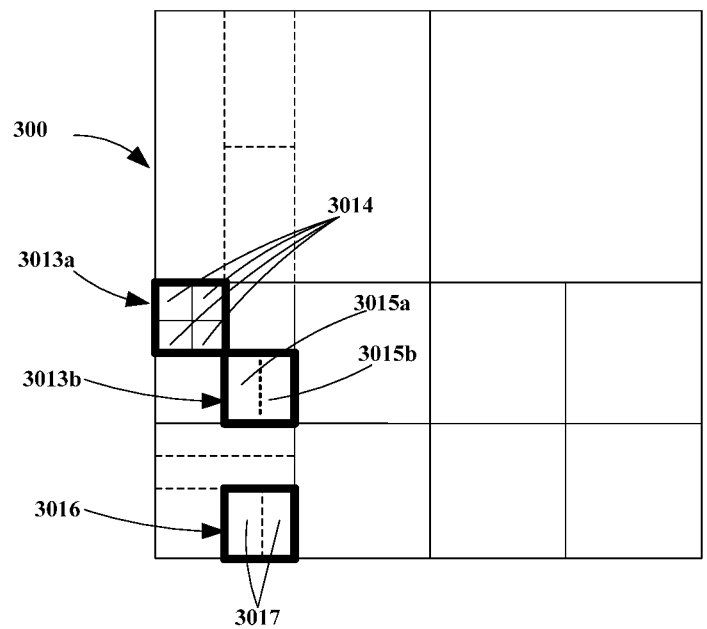
FIG. 3(A) is a schematic diagram of a coding unit group.
Figure 3B:
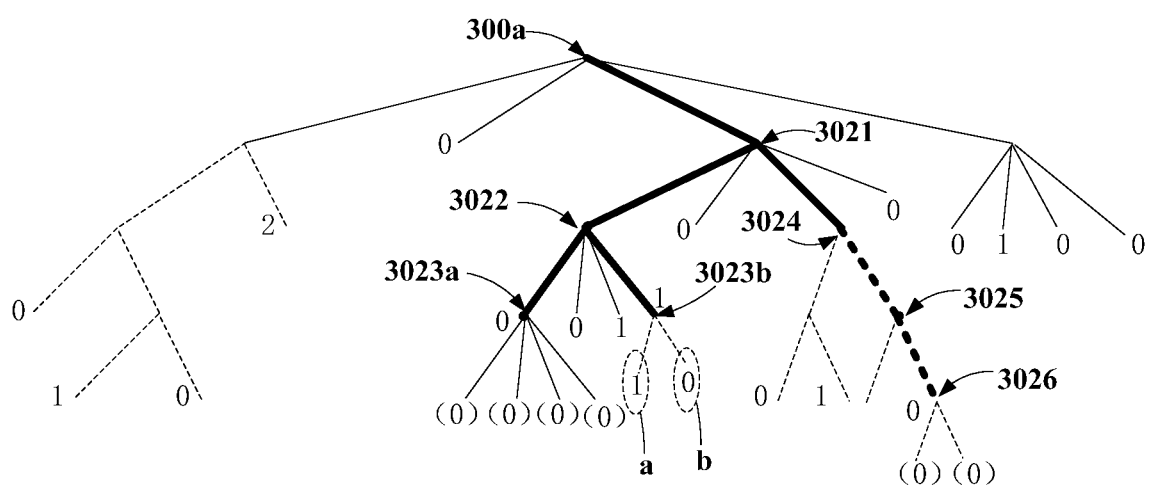
FIG. 3(B) is a schematic diagram of a quad-tree plus binary tree structure to which the coding unit group of FIG. 3(A) corresponds.

FIGS. 3(A) and 3(B) are schematic diagrams of performing group marking on uniform transform unit modes according to the method of this embodiment, in which FIG. 3(A) is a schematic diagram of coding unit groups, and FIG. 3(B) is a schematic diagram of a quad-tree plus binary tree structure to which the coding unit groups of FIG. 3(A) correspond. A node 300a in FIG. 3(B) corresponds to a coding unit group 300 in FIG. 3(A). In the quad-tree plus binary tree structure, a first flag (UTU flag) of the group units and uniform transform unit modes of the coding units in the group units are shown. In FIG. 3(A), a division level of coding unit (CU) is shown, and how many uniform transform units that each coding unit is divided into is not shown.

As shown in FIG. 3(B), nodes 3021, 3022, 3023a and 3023b are all quad-tree nodes, and depths (qtDepth) of quad-tree structures to which they correspond are 1, 2, 3, and 3, respectively, and depths (btDepth) of binary tree structures to which they correspond are all 0. Therefore, parameters of the quad-tree structures of nodes 3023a and 3023b satisfy the conditions of the above formula (1), and areas of nodes 3023a and 3023b corresponding to FIG. 3(A) are group units 3013a and 3013b.

Likewise, depths (qtDepth) of quad-tree structures to which nodes 3024, 3025 and 3026 shown in FIG. 3(B) correspond are all 2, and depths (btDepth) of binary tree structures to which they correspond are 0, 1 and 2, respectively. Therefore, parameters of the binary tree structure and parameters of the quad-tree structure of the node 3026 satisfy the conditions of above formula (1), and an area of the node 3026 corresponding to FIG. 3(A) is a group unit 3016.

As shown in FIGS. 3(A) and 3(B), as to the group unit 3013a, uniform transform unit modes of coding units 3014 included therein are all of the first value (such as 0). Hence, the first flag UTU flag of the group unit 3013a is marked as the second value (such as 0).

As to the group unit 3013b, coding units 3015a and 3015b contained therein correspond respectively to nodes a and b in FIG. 3(B), and uniform transform unit modes of the coding units 3015a and 3015b are 0 and 1, respectively, which are unequal to each other. Hence, a first flag (UTU flag) of the group unit 3013b is marked as the third value (such as 1), the first flag (UTU flag) of the group unit 3013b is represented on the node 3023b in FIG. 3(B);

As to the group unit 3016, uniform transform unit modes of a coding unit 3017 included therein are all the first value (such as 0). Hence, a first flag (UTU flag) of the group unit 3016 is marked as the second value (such as 0).

In this embodiment, for the node 3023a to which the group unit 3013a corresponds, the coding unit 3014 is marked without using a uniform transform unit mode, that is, a number 0 next to a node under the node 3023a in FIG. 3(B) is bracketed, indicating that the number 0 is not marked.

In this embodiment, for the node 3026 to which the group unit 3016 corresponds, the coding units 3017 is marked without using a uniform transform unit mode, that is, a number 0 next to a node under the node 3026 in FIG. 3(B) is bracketed, indicating that the number 0 is not marked.

In this embodiment, for the node 3023b to which the group unit 3013b corresponds, the coding units 3015a and 3015b are marked by using a uniform transform unit mode, that is, numbers 1 and 0 next to a node under the node 3023b in FIG. 3(B) are not bracketed, indicating that the number 0 is marked.

In this embodiment, operations 201 and 202 may be performed after rate distortion optimization (RDO) processing, because after the rate distortion optimization (RDO) processing is performed, information on division of the coding units may be obtained.

In this embodiment, the uniform transform unit (UTU) modes marked with the coding units in the coding unit groups and the first flag UTU flag may be stored and processed, and transmitted to an image decoder end. The image decoder end parses the received uniform transform unit (UTU) modes and the first flag (UTU flag) to perform image decoding. For example, when the image decoder end parses out that a first flag (UTU flag) of a certain group unit is 1, it proceeds with parsing uniform transform unit (UTU) modes of coding units included in the group unit to determine a mode in which the coding units are divided by the uniform transform units; and when the image decoder end parses out that the first flag (UTU flag) of a group unit is 0, it may determine that uniform transform unit (UTU) modes of coding units of the group unit are 0, i.e., 0 is indicative a mode of division of the uniform transform units of the coding units.

According to this embodiment, when the uniform transform unit modes of the coding units in the group units are identical, the uniform transform unit modes of the coding units in the group units are not marked and UTU mode signaling is skipped. Hence, storage capability, transmission capability and processing capability may be saved, image coding efficiency may be improved, and image decoding efficiency of the decoder end may also be improved.

Embodiment 2

Embodiment 2 of this disclosure provides an apparatus for performing group marking on a uniform transform unit (UTU) mode of a coding unit (CU) group, corresponding to the method in Embodiment 1. The apparatus may be provided at a coder end coding images.

In this embodiment, the coding unit group includes at least one group unit, one of the group unit including at least one coding unit, each coding unit having a corresponding uniform transform unit mode.

Figure 4:
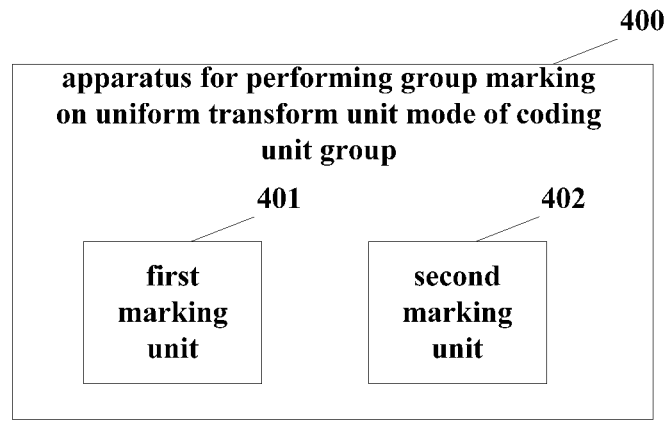
FIG. 4 is a schematic diagram of the apparatus for performing group marking on a uniform transform unit mode of a coding unit group according to an embodiment of this disclosure.

FIG. 4 is a schematic diagram of the apparatus for performing group marking on a uniform transform unit mode of a coding unit group of Embodiment 2 of this disclosure. An apparatus 400 for performing group marking on a uniform transform unit mode of a coding unit group includes a first marking unit 401 and a second marking unit 402.

In this embodiment, the first marking unit 401 marks group units according to uniform transform unit modes of coding units included in the group units; when the uniform transform unit modes of the coding units in one group unit have the same first value, a first flag is set to be of a second value, and the group unit is marked by using the first flag; and the second marking unit 402 marks the coding units in the group units according to the uniform transform unit modes of the coding units included in the group units.

According to this embodiment, when the uniform transform unit modes of the coding units in the group units are identical, the group units are marked by using the first flag. Hence, the first flag may indicate that the coding units in the group units have identical uniform transform unit modes, thereby improving image coding efficiency.

In this embodiment, when a value of a uniform transform unit mode of at least one coding unit in the group units is not equal to the first value, the first marking unit 401 sets the first flag of the group units to be of a third value different from the second value.

In this embodiment, when all the uniform transform unit modes of the coding units in the group units have the same first value, the second marking unit 402 does not mark the coding units in the group units. Hence, storage capability, transmission capability and processing capability may be saved, image coding efficiency may be improved, and image decoding efficiency of the decoder end may also be improved.

In this embodiment, when a value of a uniform transform unit mode of at least one coding unit in the group units is not equal to the first value, the second marking unit 402 marks the coding units in the group units by using the uniform transform unit mode. Hence, the coding units may be marked accurately.

Reference may be made to Embodiment 1 for explanations of the group units, which shall not be described herein any further.

Embodiment 3

Embodiment 3 of this disclosure provides a method for performing identification on a uniform transform unit (UTU) mode of a coding unit group, applicable to a decoder end used for decoding images, the uniform transform unit modes of the coding unit group being identified according to information on marking a uniform transform unit mode of a unit group.

In this embodiment, the coding unit group includes at least one group unit, one of the group unit including at least one coding unit, each coding unit having a corresponding uniform transform unit mode.

Figure 5:
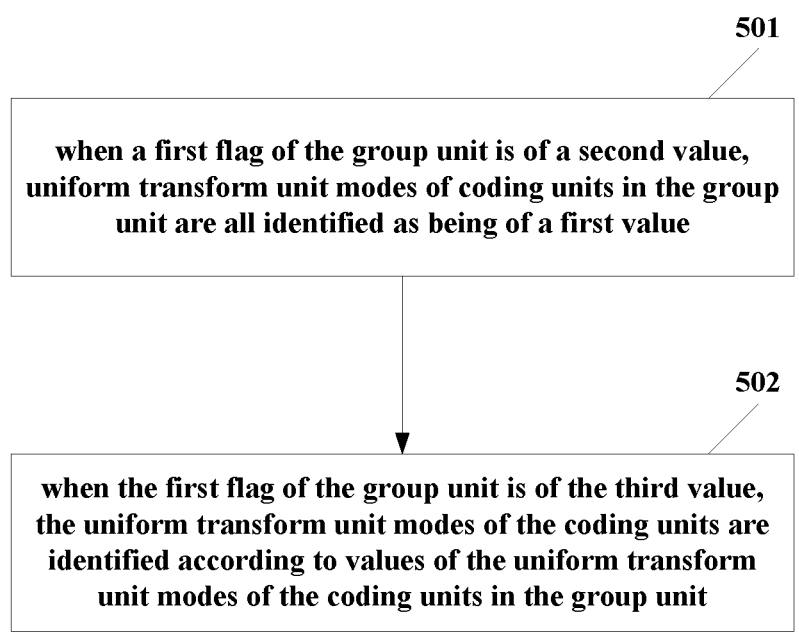
FIG. 5 is a schematic diagram of the method for identifying a uniform transform unit mode of a coding unit group according to an embodiment of this disclosure.

FIG. 5 is a schematic diagram of the method for identifying a uniform transform unit mode of a coding unit group of Embodiment 3. As shown in FIG. 5, the method includes:

operation 501: when a first flag of the group unit is of a second value, uniform transform unit modes of coding units in the group unit are all identified as being of a first value.

In this embodiment, the uniform transform unit modes of the coding units in the group unit may be identified according to only the first flag of the group unit. Therefore, an amount of data needed in decoding by the decoder end is relatively small, and a speed of decoding is relatively fast.

In this embodiment, as shown in FIG. 5, the method may further include:

operation 502: when the first flag of the group unit is of the third value, the uniform transform unit modes of the coding units are identified according to values of the uniform transform unit modes of the coding units in the group unit.

For example, the first identifying unit 501 may extract the values of the uniform transform unit modes of the coding units in the group unit from information on marking unit groups, and identify the uniform transform unit modes of the coding units according to the values.

In this embodiment, reference may be made to related description in Embodiment 1 for explanations of the first value, the second value, the third value and the group units.

Embodiment 4

Embodiment 4 of this disclosure provides an apparatus for performing identification on a uniform transform unit mode of a coding unit group, which may be provided at a decoder end decoding images, the uniform transform unit modes of the coding unit group being identified according to information on marking a uniform transform unit mode of a unit group.

In this embodiment, the coding unit group includes at least one group unit, one of the group unit including at least one coding unit, each coding unit having a corresponding uniform transform unit mode.

Figure 6:
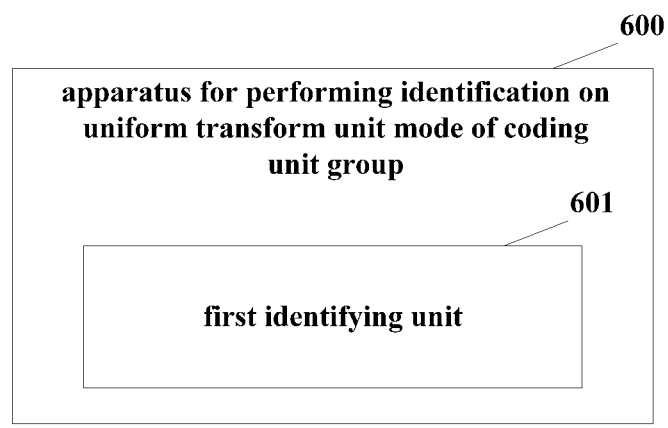
FIG. 6 is a schematic diagram of the apparatus for identifying a uniform transform unit mode of a coding unit group according to an embodiment of this disclosure.

FIG. 6 is a schematic diagram of the apparatus for performing identification on a uniform transform unit mode of a coding unit group of Embodiment 4. As shown in FIG. 6, an apparatus 600 for performing identification on a uniform transform unit mode of a coding unit group includes a first identifying unit 601.

In this embodiment, when a first flag of the group unit is of a second value, first the identifying unit 601 identifies all uniform transform unit modes of coding units in the group unit as being of a first value.

In this embodiment, the uniform transform unit modes of the coding units in the group unit may be identified according to only the first flag of the group unit. Therefore, an amount of data needed in decoding by the decoder end is relatively small, and a speed of decoding is relatively fast.

For example, in this embodiment, when the first flag of the group unit is of the third value, the identifying unit 601 identifies the uniform transform unit modes of the coding units according to values of the uniform transform unit modes of the coding units in the group unit. For example, the identifying unit 601 may extract the values of the uniform transform unit modes of the coding units in the group unit from information on marking unit groups, and identify the uniform transform unit modes of the coding units according to the values.

In this embodiment, reference may be made to related description in Embodiment 1 for explanations of the first value, the second value, the third value and the group units.

Embodiment 5

Embodiment 5 of this disclosure provides an electronic device, including the apparatus described in Embodiment 2, and/or the apparatus described in Embodiment 4.

For example, the electronic device includes the apparatus described in Embodiment 2, and may code an image, and during the process of coding the image by the electronic device, the device described in Embodiment 2 may mark uniform transform unit modes of a coding unit group; or the electronic device includes the apparatus described in Embodiment 4, and the electronic device may decode coded information to obtain an image, and during a decoding process of the electronic device, the apparatus described in Embodiment 4 may identify uniform transform unit modes of the coding unit group according to information on marking uniform transform unit modes of a unit group; or, the electronic device includes the apparatus described in Embodiment 2 and the apparatus described in Embodiment 4, and the apparatus described in Embodiment 2 may mark uniform transform unit modes of a coding unit group, and the apparatus described in Embodiment 4 may identify uniform transform unit modes of the coding unit group according to information on marking uniform transform unit modes of a unit group.

Figure 7:
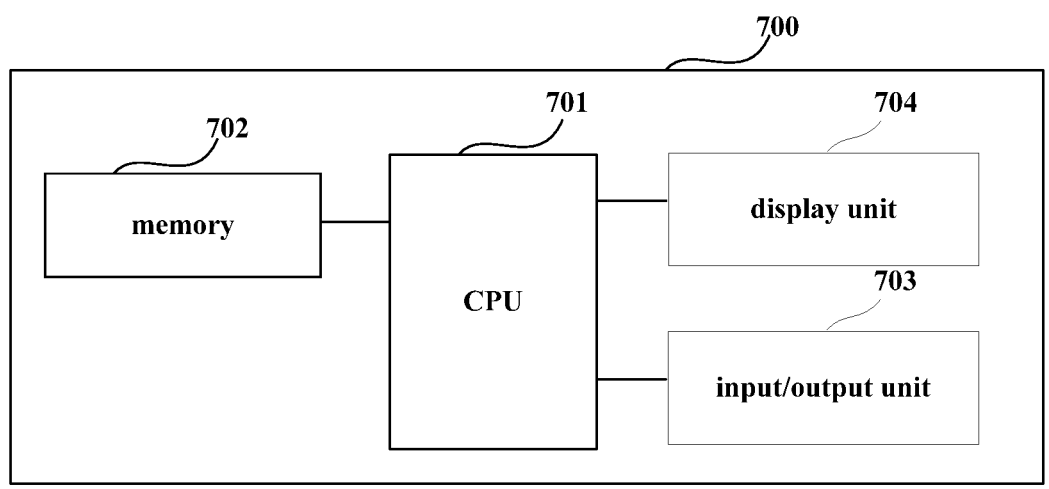
FIG. 7 is a schematic diagram of a structure of the electronic device of according to an embodiment of this disclosure.

FIG. 7 is a schematic diagram of a structure of the electronic device of Embodiment 5 of this disclosure. As shown in FIG. 7, an electronic device 700 may include a central processing unit (CPU) 701 and a memory 702, the memory 702 being coupled to the central processing unit 701. The memory 702 may store various data, and furthermore, it may store a program for performing group marking and identification on a uniform transform unit mode of a coding unit group, and execute the program under control of the central processing unit 701.

In one implementation, the functions of the apparatus described in Embodiment 2 and/or the apparatus described in Embodiment 4 may be integrated into the central processing unit 701.

The central processing unit 701 may be configured to: mark group units according to uniform transform unit modes of coding units included in the group units; wherein when the uniform transform unit modes of the coding units in the group units have the same first value, a first flag is set to be of a second value, and the group unit is marked by using the first flag; and mark the coding units in the group units according to the uniform transform unit modes of the coding units included in the group units.

Furthermore, the central processing unit 701 may be configured that the first value is zero.

Furthermore, the central processing unit 701 may be configured to: when a value of a uniform transform unit mode of at least one coding unit in the group unit is not equal to the first value, set the first flag of the group units to be of a third value different from the second value.

Furthermore, the central processing unit 701 may be configured to: when all the uniform transform unit modes of the coding units in the group units have the same first value, not mark the coding units in the group unit.

Furthermore, the central processing unit 701 may be configured to: when a value of a uniform transform unit mode of at least one coding unit in the group units is not equal to the first value, mark the coding units in the group units by using the uniform transform unit mode.

Furthermore, the central processing unit 701 may be configured that a parameter of a quad-tree plus binary tree structure of the group units satisfies the following conditions:

$$qtDepth+btDepth/2>2.5;$$

where, qtDepth is a depth of a quad-tree structure to which the group units correspond, and btDepth is a depth of a binary tree structure to which the group units correspond.

Furthermore, the central processing unit 701 may be configured that the group units do not include other group units any longer.

Furthermore, the central processing unit 701 may be configured to: when a first flag of the group unit is of a second value, identify uniform transform unit modes of coding units in the group unit all as being of a first value.

Furthermore, the central processing unit 701 may be configured to: when the first flag of the group unit is of the third value, identify the uniform transform unit modes of the coding units according to values of the uniform transform unit modes of the coding units in the group unit.

Furthermore, as shown in FIG. 7, the electronic device 700 may include an input/output unit 703, and a display unit 704, etc. Functions of the above components are similar to those in the related art, and shall not be described herein any further. It should be noted that the electronic device 700 does not necessarily include all the parts shown in FIG. 7, and furthermore, the electronic device 700 may include parts not shown in FIG. 7, and the related art may be referred to.

An embodiment of the present disclosure provides a computer readable program code, which, when executed in an apparatus for performing group marking on a uniform transform unit mode of a coding unit group, or an apparatus for performing identification on a uniform transform unit mode of a coding unit group, or an electronic device, will cause the apparatus for performing group marking on a uniform transform unit mode of a coding unit group, or the apparatus for performing identification on a uniform transform unit mode of a coding unit group, or the electronic device to carry out the method described in Embodiment 1 or 3.

An embodiment of this disclosure provides a computer storage medium, including a computer readable program code, which will cause an apparatus for performing group marking on a uniform transform unit mode of a coding unit group, or an apparatus for performing identification on a uniform transform unit mode of a coding unit group, or an electronic device to carry out the method described in Embodiment 1 or 3.

The apparatus for performing group marking on a uniform transform unit mode of a coding unit group or the apparatus for performing identification on a uniform transform unit mode of a coding unit group described with reference to the embodiments of this disclosure may be directly embodied as hardware, software modules executed by a processor, or a combination thereof. For example, one or more functional block diagrams and/or one or more combinations of the functional block diagrams shown in FIGS. 4 and 6 may either correspond to software modules of procedures of a computer program, or correspond to hardware modules. Such software modules may respectively correspond to the operations in Embodiment 1 or 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 4 and 6 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 2 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for performing group marking on a uniform transform unit mode of a coding unit group, the coding unit group including at least one group unit, the at least one group unit including at least one coding unit, each coding unit having a corresponding uniform transform unit mode, the apparatus comprising:
a memory; and
a processor coupled to the memory and configured to:
perform a first marking to mark group units according to uniform transform unit modes of coding units included in the group units; wherein when the uniform transform unit modes of the coding units in a group unit have a first value, a flag is set to be of a second value, and the flag is used to mark the group unit; and
determine whether a second marking is to be performed to mark the coding units in the group units according to the uniform transform unit modes of the coding units included in the group units,
wherein,
parameters of a quad-tree plus binary tree structure of the group units satisfies the following condition:

$$qtDepth+btDepth/2>2.5;$$

where, qtDepth is a depth of a quad-tree structure to which the group unit corresponds, and btDepth is a depth of a binary tree structure to which the group unit corresponds.

2. The apparatus according to claim 1, wherein, the first value is zero.

3. The apparatus according to claim 1, wherein, when a value of a uniform transform unit mode of at least one coding unit in one group unit is not equal to the first value, the first marking sets the flag of the one group unit to be of a third value different from the second value.

4. The apparatus according to claim 1, wherein, when all the uniform transform unit modes of the coding units in the group unit have the first value, the second marking does not mark the coding units in the group unit.

5. The apparatus according to claim 1, wherein, when a value of a uniform transform unit mode of at least one coding unit in one group unit is not equal to the first value, the second marking marks the coding units in the one group unit by using the uniform transform unit mode.

6. The apparatus according to claim 1, wherein, the group unit does not comprise other group units.

7. An electronic device, comprising the apparatus for performing group marking on a uniform transform unit mode of a coding unit group as claimed in claim 1.

8. A method for performing group marking on a uniform transform unit mode of a coding unit group, the coding unit group including at least one group unit, the at least one group unit including at least one coding unit, each coding unit having a corresponding uniform transform unit mode, the method comprising:
marking group units according to uniform transform unit modes of coding units included in the group units; wherein when the uniform transform unit modes of the coding units in a group unit have a first value, a flag is set to be of a second value, and the group unit is marked by using the flag; and determining whether to mark the coding units in the group units according to the uniform transform unit modes of the coding units included in the group units, wherein, parameters of a quad-tree plus binary tree structure of the group units satisfy the following condition:

$qt\text{Depth} + bt\text{Depth}/2 > 2.5;$ where, qtDepth is a depth of a quad-tree structure to which the group unit corresponds, and btDepth is a depth of a binary tree structure to which the group unit corresponds.

9. The method according to claim 8, wherein the marking the coding units in the group units according to the uniform transform unit modes of the coding units included in the group units determines not to mark the coding units in the group unit when all the uniform transform unit modes of the coding units in one group unit have the first value.

\* \* \* \* \*